D. ROBINSON.
Wagon-Brake.
No. 22,749.
Patented Jan. 25, 1859.
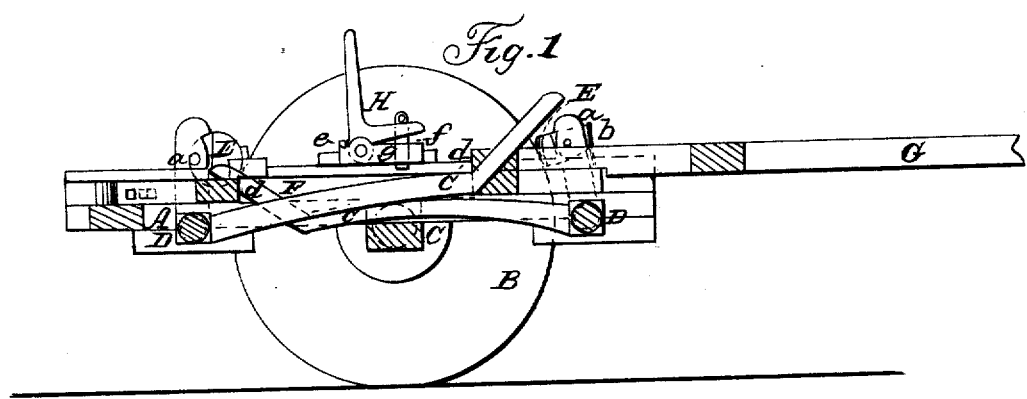
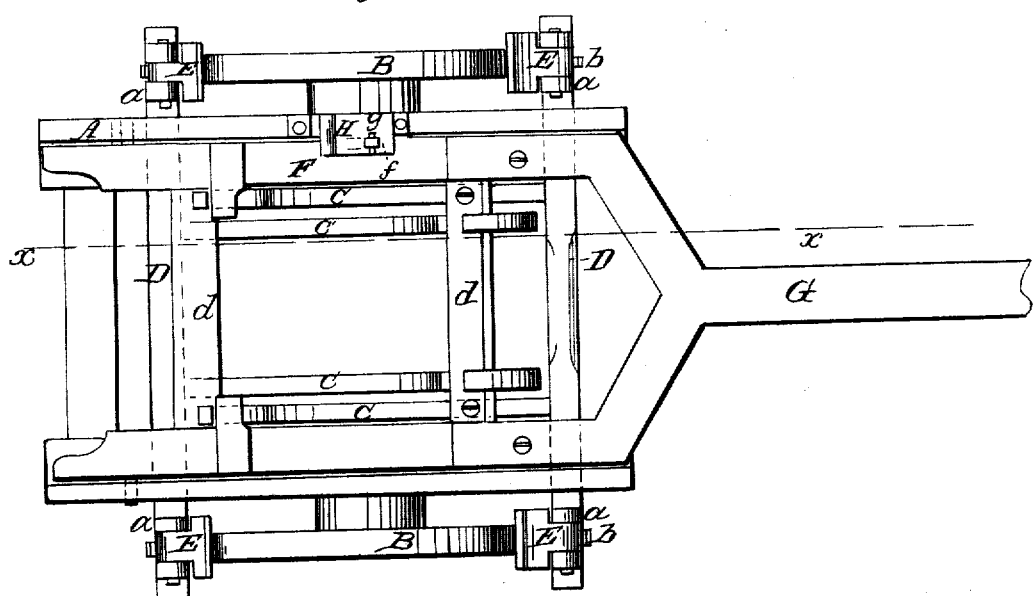
Witnesses:
G. S. Ames
Timothy Carpenter
Inventor:
Daniel Robinson

UNITED STATES PATENT OFFICE.

DANIEL ROBINSON, OF LENOX, PENNSYLVANIA.

WAGON-BRAKE.

Specification of Letters Patent No. 22,749, dated January 25, 1859.

*To all whom it may concern:*

Be it known that I, DANIEL ROBINSON, of Lenox, in the county of Susquehanna and State of Pennsylvania, have invented a new and Improved Self-Acting Brake for Wheel-Vehicles; and I do hereby declare that the following is a full, clear, and exact description of the same, reference being had to the annexed drawings, making a part of this specification, in which—

Figure 1, is a side sectional view of my invention applied to a cart, $x$, $x$, Fig. 2, indicates the plane of section. Fig. 2, is a plan or top view of the same.

Similar letters of reference indicate corresponding parts in the two figures.

This invention consists in attaching shoes to rock shafts which are fitted in the bed or truck of the vehicle and having curved bars attached to said rock shafts, the bars passing through a sliding frame fitted in the bed or truck, said frame having the draft pole attached to it. The brake is operated by the momentum of the vehicle when the speed of the same is checked or by gravity alone when descending eminences, the desired result being effected by a very simple means and one that may be applied to all wheel-vehicles.

To enable those skilled in the art to fully understand and construct my invention I will proceed to describe it.

A, represents a bed or truck of a cart, said bed or truck being mounted on wheels B, B, the axle C, of which is about underneath the center of the bed or truck A.

D, D, are two rock shafts which pass through the bed or truck A, and are allowed to turn therein. To each end of each shaft D, a vertical frame $a$, is attached and in each frame $a$, a shoe E, is placed, said shoes being pivoted in the frames $a$, the front shoes having each a spring $b$, bearing against their outer sides. The outer surfaces of the shoes E, are of convex form, as shown clearly in Fig. 1, and the springs $b$, have a tendency to keep the faces of the front shoes downward, the object of which will be presently explained.

To each shaft D, two curved or bent bars $c$, $c$, are attached, said bars being within the bed or truck A, and having their curved or bent portions passing through traverse pieces $d$, $d$, of a frame F, which is fitted in the bed or truck A, and allowed to slide freely therein in a longitudinal direction. The ends of the bars $c$, $c$, of both rock shafts are bent upward as shown clearly in Fig. 1, and to the front end of the frame F, a draft pole G, is attached.

To one side of the bed or truck A, a bent lever H, is attached as shown at $e$, and to the lever H, a vertical pin $f$, is secured, said pin passing through a bar $g$, to which the lever H, is attached, and when desired made to fit into a hole in one side of the frame F.

The operation is as follows: As the vehicle is drawn along, the frame F, will be drawn forward to its fullest extent, so that the curved or bent portions of the bars $c$, $c$, of the rock shafts D, D, will be actuated and the front rock shaft D, turned so as to throw its frames $a$, outward from the wheels B, and the frames $a$, of the back rock shaft D, toward the wheels. The back shoes will in consequence prevent the wheels B, from turning backward as the tendency of the wheels to move in such direction will instantly cause the back shoes to bend against the wheels. The back shoes therefore perform the function of a "scotch", and prevent the casual backing of the vehicle. In descending hills the gravity of the vehicle will cause the bed or truck A to move forward and actuate the bars $c$, $c$, of the rock shafts in a reverse manner so that the shoes of the front rock shaft will be pressed against the wheels and the shoes of the back rock shaft thrown outward from the wheels. The front shoes therefore perform the office of brakes preventing the forward movement of the vehicle. In case the speed of the vehicle is suddenly checked on a level surface the momentum of the vehicle will then actuate the front shoes and cause them to press against the wheels. It will be seen therefore that the brakes are self-acting. The lever H, and pin $f$, serve as a stop device,—by actuating the lever H, and forcing the pin $f$, into the hole in the frame F, the latter is prevented from moving and the brake rendered inoperative. This may be necessary or desirable in certain cases. It will be seen that this invention may be readily applied to all wheel-vehicles including rail-road cars. When the improvement is applied to four wheel vehicles the invention may be applied to one pair of wheels only.

Having thus described my invention what I claim as new and desire to secure by Letters Patent, is,

The combination and arrangement of the sliding frame F, curved bars c, attached to the rock shafts D, D, and passing through the traverse bars d, of the frame F, and the shoes E, attached to the ends of the rock shafts, the several parts being fitted in the truck or bed A, substantially as and for the purpose set forth.

DANIEL ROBINSON.

Witnesses:
G. S. AMES,
TIMOTHY CARPENTER.